Patented July 1, 1941

2,247,351

UNITED STATES PATENT OFFICE 2,247,351

PROLAMINE COMPOSITION

Pierre Drewsen and John R. Little, Sandusky, Ohio, assignors to The Hinde & Dauch Paper Company, Sandusky, Ohio, a corporation of Ohio No Drawing. Application September 2, 1938, Serial No. 228,213

11 Claims. (Cl. 134—12)

This application is a continuation in part of our co-pending application Serial No. 151,684, filed July 2, 1937, for "Resinous composition."

In particular, the invention which forms the subject-matter of this division is directed to the preparation of water-insoluble prolamines dissolved in water solutions of other materials, thus utilizing certain of their less-generally appreciated properties to accomplish such dissolution without expensive or dangerous solvents. According to the most recent and accepted technical literature on the subject, the prolamines are regarded as insoluble in water, insoluble in absolute alcohol, and insoluble in neutral solutions generally, although with some exceptions. They are known to be soluble in 60% to 80% alcohol and in some alkaline solutions.

Expense, danger of fire, and other considerations, make alcohol undesirable as a solvent for prolamines in many of the commercial uses in which prolamines, and notably zein, could otherwise be employed. Furthermore, no commercially practical means are known to applicants to have been worked out for using alkaline solvents for zein or other prolamines, except that a caustic solution of zein is known for use as a plywood adhesive.

Our invention, then, has developed from our discovery that zein, which is a water-insoluble material, can be dissolved rapidly and completely in a water solution of rosin in ammonia. We have discovered that our solution can be made using materials of a group exemplified by resins, dissolved in liquid solutions of inorganic volatile alkalies, with a protein of the prolamine group (zein being the leading example) incorporated in the resinous solution. A plasticizer may be added where desired for further modification of the properties of the composition.

By way of illustration of our invention, certain specific examples are given hereafter wherein a prolamine, an alkaline solvent, and rosin are thoroughly mixed, resulting in a solution or emulsion which is stable for an indefinite period, at least several months. Such a composition is susceptible of further treatment for the purpose of making it either more or less fluid, as the case may be, and such treatment may include the addition of plasticizers.

The following is an illustrative example of the preferred method and of the composition obtained thereby, this being described throughout with respect to zein, since zein at the present time is the most desirable material of the prolamine group to use in practical work.

EXAMPLE 1

Steps 1 and 1A are not necessarily sequential.

Step 1—Prepared zein

Improved action of the zein is obtained by pretreating it with ammonia. The details of the treatment may be varied. Satisfactory results are attained by making a paste of zein and aqua ammonia in a mechanical mixer in the following proportions:

| | Pounds |
|---|---|
| Zein (dry weight) | 4 |
| Water | 3 |
| Aqua ammonia 26° Bé | 1 |

Step 1A—Ammonium rosinate

Make ammonium rosinate separately by mixing ammonia with rosin into a stiff taffy-like homogeneous mixture. A satisfactory formula is

| | Pounds |
|---|---|
| Aqua ammonia 26° Bé | 1 |
| Powdered rosin (dry weight) | 4 |

The desirable limits of the ammonia are from about 20% to about 35% (by weight) of the dry weight of rosin. The preferred resin is ordinary wood rosin or gum rosin; that is, paper-maker's rosin. Heat to not above 200° F., and mix until dissolved. Enough ammonia must remain to keep the rosin dissolved, and enough does so remain at or below the temperature indicated. The temperature is not otherwise critical.

Step 2—Zein rosinate

Mix thoroughly the prepared zein with the ammonium rosinate, making zein rosinate. The proportions may be considerably varied, but it has been found that the highest relative amount of zein which has been found feasible in the zein rosinate composition is 3 pounds dry weight of zein to 1 pound dry weight of rosin. Thus, as many as three batches of prepared zein according to Step 1 could be mixed with one batch of ammonium rosinate according to Step 1A. Additional water may be added if a thinner mix is desired. A plasticizer may be employed in Step 2, as explained below.

EXAMPLE 2

Dissolve rosin in about 10% of its own weight of sodium hydroxide or potassium hydroxide, dilute such alkali rosinate with water, and mix thoroughly with zein, which need not be pretreated, although the zein will enter more readily into the composition if pre-treated according to Step 1, either with ammonia, sodium hydroxide or potassium hydroxide. Neither refinement of measurement nor purity of ingredients is of fundamental importance in the making of zein rosinate, since the process is to be worked on a commercial scale, to make an inexpensive material, using ingredients of commercial quality. Consequently in the formulas set out, although zein is included on a dry weight basis, a quicker compounding is attained if prepared zein, according to Step 1, is used.

FORMULA A

| | Pounds |
|---|---|
| Zein (dry weight) | 20 |
| Rosin (dry weight) | 10 |
| Water | 100 |
| NaOH (or KOH) | 1 to 2 |

If prepared zein is used, take five of the batches according to Step 1, and disregard the water therein. Two pounds of hydroxide makes the zein rosinate a little clearer than one pound, but there is no advantage in going above the proportion of two pounds.

FORMULA B

| | Pounds |
|---|---|
| Zein (or 7½ batches Step 1) | 30 |
| Rosin | 10 |
| Water | 110 |
| NaOH (or KOH) | 1½ to 2 |

Whichever of the various foregoing illustrative examples is employed, the effect is to use a basic rosinate as a solvent for zein, and thus avoid the necessity of using one of the more expensive, complex, and generally less desirable solvents which has hitherto been necessary, such as alcohol or various synthetic organics.

This zein rosinate is preferably mixed to about the consistency of a stiff taffy candy, the stiffness depending upon the temperature as well as upon the proportion of liquid in the mix. At room temperature, if volatiles are permitted to evaporate, and if no plasticizers have been used, it becomes hard and brittle, resembling dried glue in appearance. For convenience in handling, and to facilitate drying, it may be taken from the mixer through pressing rolls and so formed into sheets.

Plasticizers may be added to toughen the product, which is otherwise somewhat brittle in solid phase. Suitable plasticizers include vegetable oils, such as castor or linseed, or synthetic organics such as dibutyl phthalate, dibutyl tartrate, tricresyl phosphate.

Zein rosinate may be kept in storage indefinitely, showing no deterioration by age or by moisture conditions. It is thermoplastic, and will thus soften under heat, but is otherwise uninjured by temperatures which are not so high as to cause charring, and again hardens on cooling. Unexpectedly, even when kept for weeks in sheets or in lumps, it retains an appreciable content of the ammonia or other base used in the rosinate, and so long as such base remains, will be to some extent water soluble, and for this reason can be thinned to any degree by the addition of water and remain substantially stable in phases all the way from a solid to an almost water thin liquid.

The ammonia can be completely driven off by application of heat on the order of 125° C. for a time on the order of 5 to 30 seconds, where the zein resin rosinate is reduced to a thickness on the order of a few thousandths of an inch, and this property enables substantially water-proof coatings to be made of the material.

The color of the zein rosinate depends principally upon the grade of rosin used, and experiment has indicated color makes no other difference in the physical or chemical properties of the material, or in the ease with which it is compounded. Obviously where a dark colored zein rosinate would be objectionable, a light colored rosin will be employed, but where not objectionable a less expensive darker rosin would be used.

The exact nature of zein rosinate has not been fully investigated, but the Tyndall effect is observed therein, indicating that it is an emulsion.

It will be seen from the foregoing that we have invented a composition of matter and method of making the same which permits the aqueous dissolution of a proteid which has hitherto been regarded as not soluble in water, accomplishing this result by first dissolving or dispersing or in some way disposing of the zein in a basic rosinate.

Other modes of applying the principle of our invention may be employed instead of the one explained, change being made as regards the materials employed, provided the ingredients stated by any of the following claims or the equivalent of such stated ingredients be employed.

We therefore particularly point out and distinctly claim as our invention:

1. As a composition of matter, zein dissolved in a water solution consisting of rosin dissolved in an alkali selected from the group consisting of NH4OH, NaOH, KOH.

2. As a composition of matter, a solid consisting of rosin with a dispersion of zein therein and a trace of an alkali selected from the group consisting of NH4OH, NaOH, KOH.

3. A composition of zein and rosin consisting of three parts of ammoniated zein to one part of rosin dissolved in an aqueous alkali.

4. A process of making zein rosinate which comprises first treating zein with ammonia, then dissolving the zein so treated in ammonium rosinate.

5. A process of making zein rosinate which comprises first treating zein with an alkali hydroxide, then dissolving the zein so treated in alkali rosinate.

6. A process of making zein rosinate in solid phase which comprises initially mixing rosin and an alkali selected from the group consisting of NH4OH, NaOH and KOH to form a pasty consistency, incorporating zein therein, and drying the paste.

7. A process of making zein rosinate which comprises treating zein with an aqueous solution of an alkali selected from the group consisting of NH4OH, NaOH, and KOH; separately forming a mixture of rosin with a similar alkali and incorporating the said two mixtures together.

8. A composition of matter containing zein and alkali rosinate in an aqueous solution.

9. A composition of matter containing zein and ammonium rosinate in an aqueous solution.

10. As a new composition of matter alkali rosinate of zein.

11. As a new composition of matter ammoniated rosinate of zein.

PIERRE DREWSEN.
JOHN R. LITTLE.